United States Patent
Mohania et al.

(10) Patent No.: US 9,208,194 B2
(45) Date of Patent: *Dec. 8, 2015

(54) EXPANDING HIGH LEVEL QUERIES

(71) Applicant: International Business Machines Corporation, Armonk, NY (US)

(72) Inventors: Mukesh K. Mohania, Agra (IN); Raja Sreekanth Nidadavolu, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,204

(22) Filed: Aug. 25, 2014

(65) Prior Publication Data

US 2014/0358956 A1 Dec. 4, 2014

Related U.S. Application Data

(63) Continuation of application No. 13/630,534, filed on Sep. 28, 2012, now Pat. No. 8,862,609.

(51) Int. Cl.
*G06F 17/30* (2006.01)

(52) U.S. Cl.
CPC ...... *G06F 17/30398* (2013.01); *G06F 17/3043* (2013.01); *G06F 17/30401* (2013.01)

(58) Field of Classification Search
USPC ............... 707/4, 766; 715/200; 709/204–206
See application file for complete search history.

(56) References Cited

U.S. PATENT DOCUMENTS

| | | | |
|---|---|---|---|
| 5,450,537 A * | 9/1995 | Hirai et al. ............... | 715/200 |
| 5,555,408 A | 9/1996 | Fujisawa et al. | |
| 6,026,388 A | 2/2000 | Liddy et al. | |
| 6,484,162 B1 | 11/2002 | Edlund et al. | |
| 6,546,381 B1 | 4/2003 | Subramanian et al. | |
| 7,536,382 B2 | 5/2009 | Zhou et al. | |
| 7,643,822 B2 | 1/2010 | Ling et al. | |
| 7,720,867 B2 | 5/2010 | Subramanian et al. | |
| 8,065,316 B1 | 11/2011 | Baker et al. | |
| 8,095,533 B1 | 1/2012 | Ponte | |
| 8,103,653 B2 | 1/2012 | Newbold et al. | |
| 8,402,032 B1 | 3/2013 | Brunsman et al. | |

(Continued)

OTHER PUBLICATIONS

SAP AG, "What's New in BusinessObjects XI 3.1 Service Pack 2" [online]. Copyright 2009 SAP AG, Feb. 15, 2010, [retrieved on Jan. 11, 2012]. Retrieved from the internet<URL: http://help.sap.com/businessobject/product_guides/boexir31sp2/en/xi31_sp2_whats_new_en.pdf>.

(Continued)

*Primary Examiner* — Etienne Leroux
(74) *Attorney, Agent, or Firm* — Isaac J. Gooshaw (57) ABSTRACT

One or more computer processors identify words in a natural language query that have previously-established associations with stored data upon which the query will be executed. The natural language query is formatted to a query template that includes at least one first component and at least one second component. One or more computer processors modify the at least one first component of the a query template based on at least one link between the one or more words in the natural language query and the at least one first component. One or more computer processors generate a new query by adding one or more values to the query template. The one or more values are added to the query template based on the modification of the at least one first component. One or more computer processors execute a search based on the new query.

17 Claims, 4 Drawing Sheets

(56) References Cited

U.S. PATENT DOCUMENTS

| | | | |
|---|---|---|---|
| 8,862,609 B2 * | 10/2014 | Mohania et al. | 707/766 |
| 2007/0239671 A1 | 10/2007 | Whitman et al. | |
| 2008/0244429 A1 | 10/2008 | Stading | |
| 2008/0263019 A1 * | 10/2008 | Harrison et al. | 707/4 |
| 2010/0306228 A1 | 12/2010 | Carpenter et al. | |
| 2011/0078166 A1 | 3/2011 | Oliver et al. | |
| 2011/0087686 A1 | 4/2011 | Brewer et al. | |

OTHER PUBLICATIONS

U.S. Appl. No. 13/630,534, entitled "Expanding High Level Queries", filed Sep. 28, 2012.

* cited by examiner

EXPANDING HIGH LEVEL QUERIES

FIELD OF THE INVENTION

The present invention relates generally to the field of data management and more particularly to manipulating user queries into queries that can be processed and understood by a data processing system.

BACKGROUND OF THE INVENTION

Many businesses and organizations store large amounts of data for recording purposes and analytics. In fact, a whole field has developed for computer-based techniques for identifying, extracting, and analyzing business data (e.g., associated costs and incomes, sales revenue by products, etc.). On a basic level, a query can be written and executed to retrieve desired information from various types of data repositories. The query must conform to a strict set of rules regarding form and syntax, which are dictated by a query language used to express queries into databases and information systems. It is not uncommon for individuals that desire the information (for example, a sales person, a client, upper management, etc.) to be unfamiliar with the query language. Often, the request for information is relayed to someone knowledgeable in the query language (e.g., an IT worker), who may then submit a formal query on a requester's behalf. Another common solution is to create one or more reports which can query a plurality of data sources and compile results to present business data in a human readable form. Such a report can be run at any time to retrieve current data without having to rewrite queries.

SUMMARY

Embodiments of the present invention provide a method, system, and program product for generating a query by modifying a query template. One or more processors identify one or more words in a natural language query that have previously-established associations with stored data upon which the query will be executed. The natural language query is formatted to a query template that includes at least one first component and at least one second component. One or more processors modify the at least one first component of the a query template based, at least in part, on at least one link between the one or more words in the natural language query and the at least one first component. One or more processors generate a new query by adding one or more values to the query template, wherein the one or more values are added to the query template based, at least in part, on the modification of the at least one first component. One or more processors execute a search based on the new query.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

Figure 1:
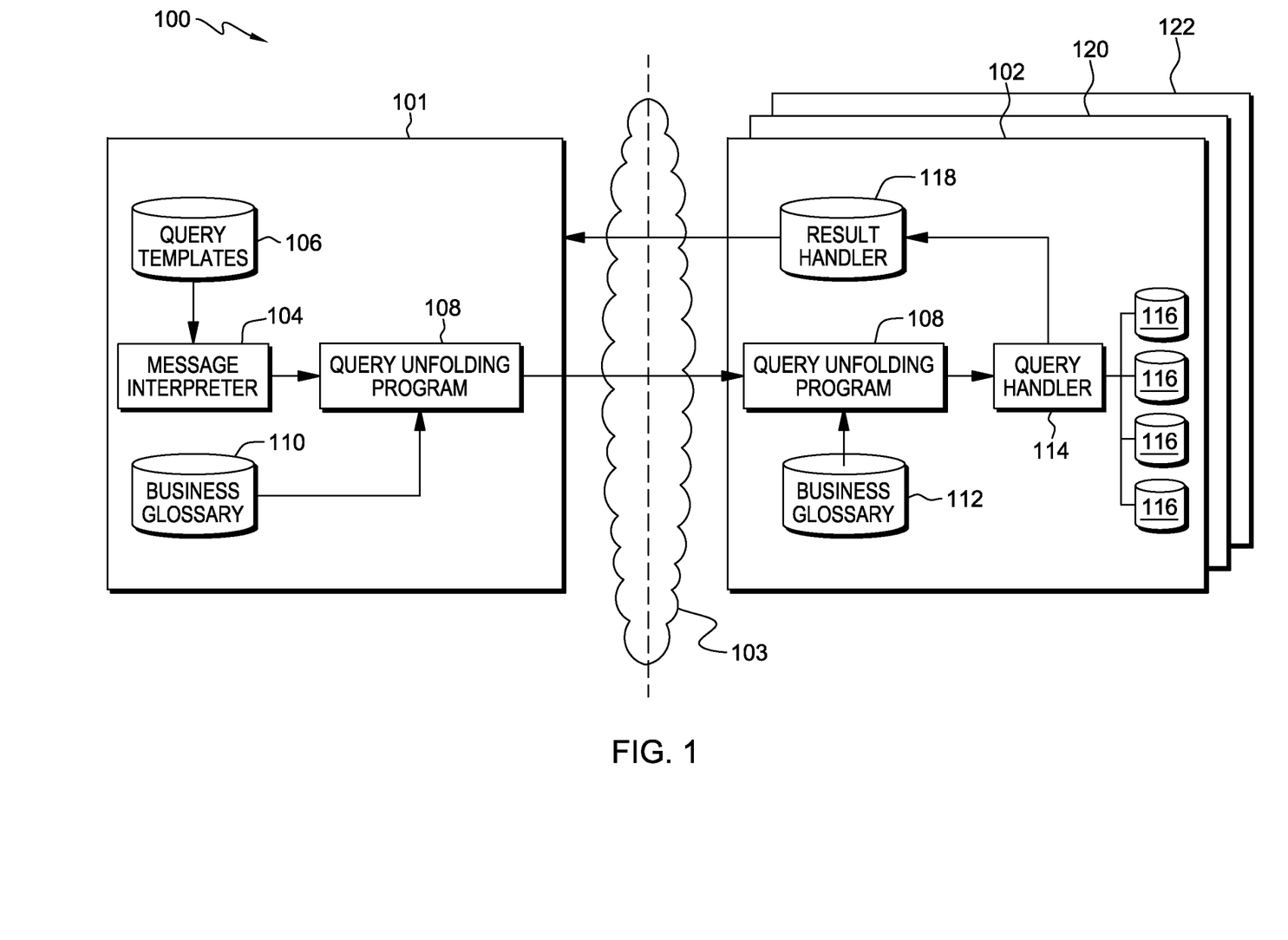
FIG. 1 illustrates a distributed data processing system, including a computing device and a server computer, according to one embodiment of the present invention.

The present invention will now be described in detail with reference to the Figures. FIG. 1 illustrates a distributed data processing system, generally designated 100, according to one embodiment of the present invention.

In the illustrated embodiment, distributed data processing system 100 comprises computing device 101 and server computers 102, 120, and 122 interconnected through network 103. Computing device 101 may be any electronic device or computing system capable of receiving input from a user, executing program instructions, and communicating with another computer through a network. In a preferred embodiment, computing device 101 is a mobile computing device, such as a personal digital assistant or smart phone, and is wirelessly connected to network 103 by Wi-Fi or cellular technology.

Computing device 101 includes message interpreter 104 and query unfolding program 108. Embodiments of the present invention recognize that using a third party to interpret a request and write a syntactically correct query can increase cost and decrease efficiency. Embodiments of the present invention further recognize that a report can be quite comprehensive, and running a full report for one small piece of information is often inefficient. Additionally, a report may not exist that returns the desired information or an individual may simply not have access to such reports. As such, embodiments of the present invention provide a method, program product, and system for composing or receiving a user or high level query or request for data in an improper form and, utilizing stored query templates and known terms, converting (unfolding) the user query into a query understandable by a computer system. Towards that end, computing device 101 may execute message interpreter 104, which is a routine or program that takes the user query and fits it to the nearest query template from a list of known query templates 106. The query, now in a template format, is passed to query unfolding program 108 which examines all terms that are not predefined from the template and determines whether these are known terms, for example by comparing them to terms in business glossary 110. Business glossary 110 may associate each known term to one or more business definitions (including attribute names of stored data), business rules (e.g., constraints limiting sought attributes, rules of structure and syntax for a query, etc.), and locations (e.g., proper databases, servers, etc.). Appropriate rules, definitions, and/or locations may be substituted and/or added into the query for the associated term. The unfolded query is subsequently submitted to the appropriate server computer as determined by determined location information, here depicted as server computer 102.

Server computer 102 may be, for example, a server computer system such as a management server, a web server, or any other electronic device or computing system capable of receiving and sending data and executing program instructions. Alternatively, server computer 102 may represent a computing system utilizing clustered computers and components to act as a single pool of seamless resources when accessed through network 103. This is a common implementation for data centers and cloud computing applications.

In one embodiment, the unfolded query received by server computer 102, is now in an understandable format for the server computer, and the server computer merely processes the query and returns results. However, embodiments of the present invention recognize that storage capacity and other resources on computing device 101 may be limited, especially when compared to the resources on server computer 102. As such, in a preferred embodiment, the unfolded query received by server computer 102, though in a format that is nearer to a syntactically correct query, is further unfolded or expanded on server computer 102. In the depicted example, a second instance of query unfolding program 108 operates on server computer 102, using a local, and perhaps more comprehensive, business glossary 112. Again appropriate associations discovered in the business glossary are substituted into the query. The resulting query can now be executed, and is passed to query handler 114, which is a routine or program that processes queries, to identify target repositories, databases, etc. (e.g., storage locations 116) and perform the query. The results may be processed by result handler 118, which may send the results to computing device 101, or alternatively, may forward the results to an interested third party (e.g., a client requesting the data).

A person of ordinary skill in the art will recognize that in alternate embodiments, the determined location information on computing device 101 may indicate that the unfolded query should be sent to multiple server computers, e.g., server computers 102, 120, and 122. Similarly, based on the involved data storage details, the initial high level query or request may be split into multiple queries and submitted to different servers for processing. Results received from result handler 118 on server computer 102 and corresponding result handler functionalities on server computers 120 and 122 would be compiled and presented to a user by a result handling functionality (not depicted) on computing device 101.

Network 103 may include connections, such as wire, wireless communication links, or fiber optic cables. In the depicted example, network 103 is the Internet representing a worldwide collection of networks and gateways that use the Transmission Control Protocol/Internet Protocol suite of protocols to communicate with one another. Network 103 may also be implemented as a number of different types of networks, such as an intranet, a local area network (LAN), or a wide area network (WAN).

Figure 4:
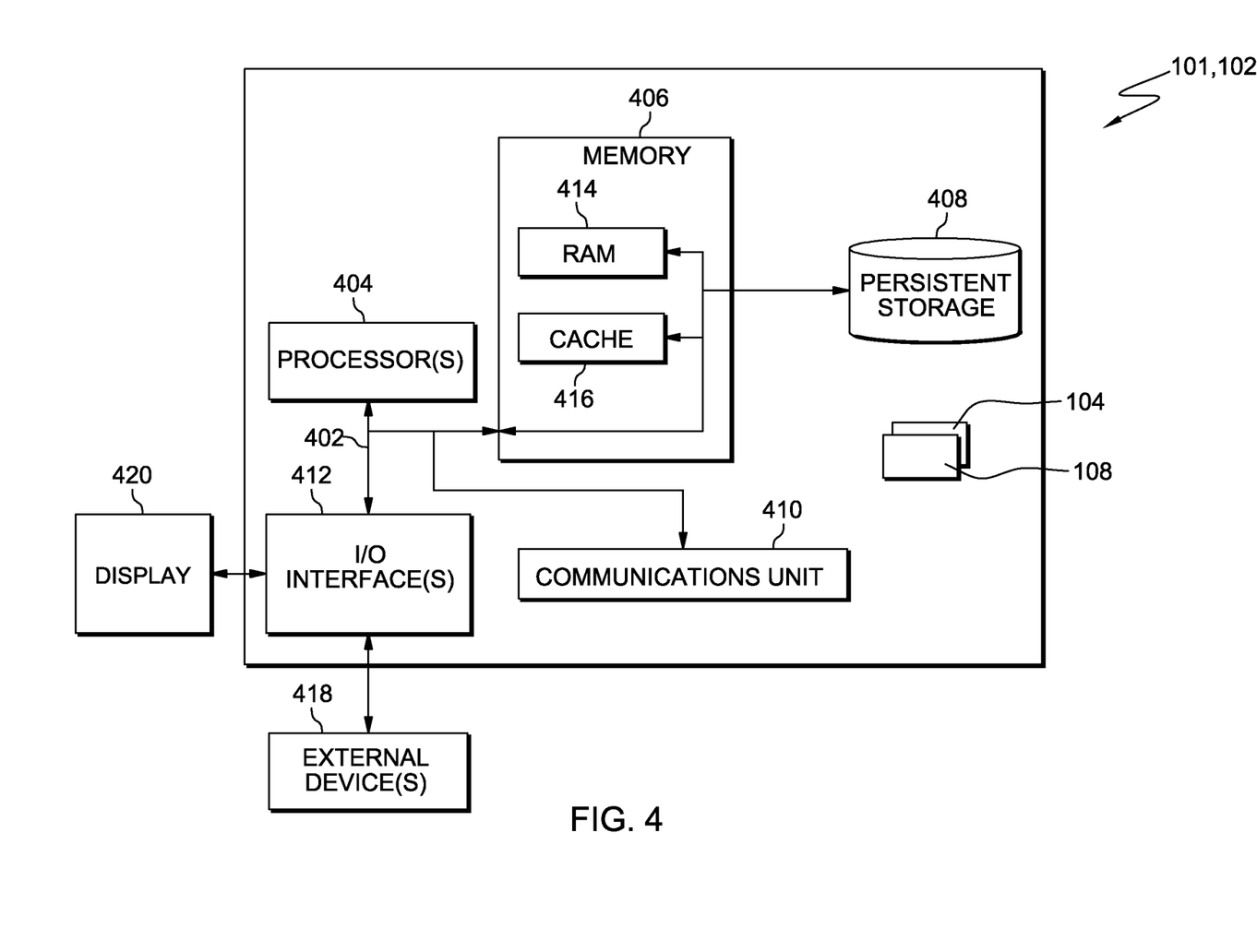
FIG. 4 depicts a block diagram of components of a computing device, such as the computing device or server computer depicted in FIG. 1, in accordance with an illustrative embodiment.

Computing device 101 and server computer 102 each maintain respective system components. Exemplary components for these systems are illustrated in FIG. 4.

Figure 2:
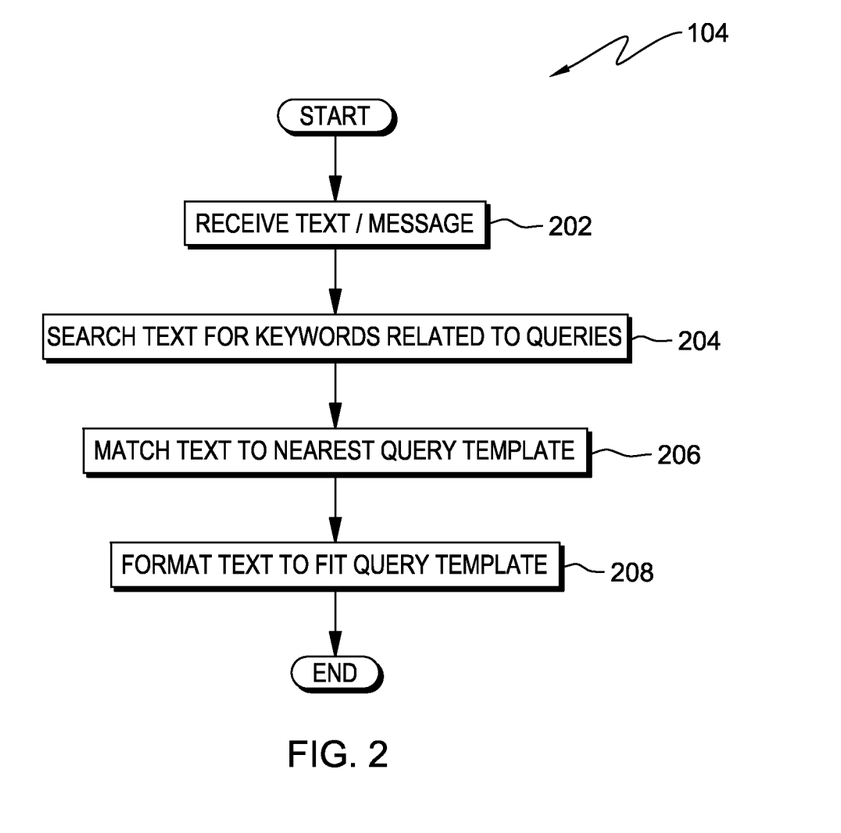
FIG. 2 depicts the operational steps of a message interpreter program for fitting a user query to a known query template.

FIG. 2 is a flowchart depicting the operational steps of message interpreter 104 for fitting a natural language query to a known query template.

Message interpreter 104 begins by receiving text or a message intended as a query (step 202). In one embodiment, message interpreter 104 may receive the text directly from a user of computing device 101. In another embodiment, computing device 101 may receive a message from a third party and direct the message to message interpreter 104. For example, the user of computing device 101 may have a client that requests information related to the user's business. Where computing device 101 is a smart phone, the client request may come in the form of a text message, a voice message, or even during a phone conversation. A text message can be sent directly to message interpreter 104. Alternatively, a voice message or recorded conversation can be converted to text using known speech recognition programs, and the converted text can be sent to message interpreter 104.

Subsequent to receiving pertinent text, message interpreter 104 searches the text for key words related to queries (step 204). As a threshold matter, in one embodiment, message interpreter 104 determines whether the received text or message is meant to be a query at all. In one exemplary implementation, the text of a message is searched for key words indicative of a query (e.g., "provide," "please provide," "I need," "send me," etc.). If it is determined that the text is a query, message interpreter 104 may search for words and/or phrases within the text that match words and/or phrases (or their equivalents) found in a list of query templates. For example, one query template might read: "select <attribute> from <location>*where <constraints>*and <constraints>*and <constraints>." The "*" represents optional components of the query that may be filled. A more basic template might look like: "provide <attribute> of <attribute> in <attribute>." A series of such templates may exist and each of the key words (query words) and their equivalents may be searched for. A query word like "select" may have a list of equivalent words such as "provide," "get," "send," etc. "From" might have the equivalent "of." "In" might have defined equivalents "between," "within," "from <date> to <date>," etc. In one embodiment, a "<constraint>" marker might be associated with query words that indicate that the constraint should be replaced by the word/phrase that follows the word. For example, "where" might be a query word defined as a known constraint limitation. If "where" is found in text, the word or phrase following "where" may be substituted into a <constraint> placeholder. Similarly, "in" might indicate that the subsequent term should be substituted into a <constraint> placeholder. Query templates may be predefined in the system or may be created by a user of the system to match the specific requirements of the user's organization.

Message interpreter 104 matches the text to the nearest query template from the list of query templates (step 206) and formats the text to fit the query template (step 208). For example, terms can be replaced with equivalent terms from the query template and clauses may be rearranged to follow a specific order. Take for example, the text "provide top 3 high value customers of abc_bank in first quarter." The nearest query template may be "select <attribute> from <location>*where <constraints>*and <constraints>*and <constraint>". Subsequent to fitting the query to the query template, the query reads: "select top 3 high value customers from abc bank *where <constraints>*and <constraints> and in first quarter" (with "in first quarter" replacing one of the optional <constraints>).

The query, now formed to the nearest template, may be forwarded to query unfolding program 108. In another embodiment, to form the initial user query, when the user is composing the query, the user may be presented with a plurality of query templates from which he can compose the query. In such a manner, the user query is already formed to a query template and may be forwarded to query unfolding program 108.

Figure 3:
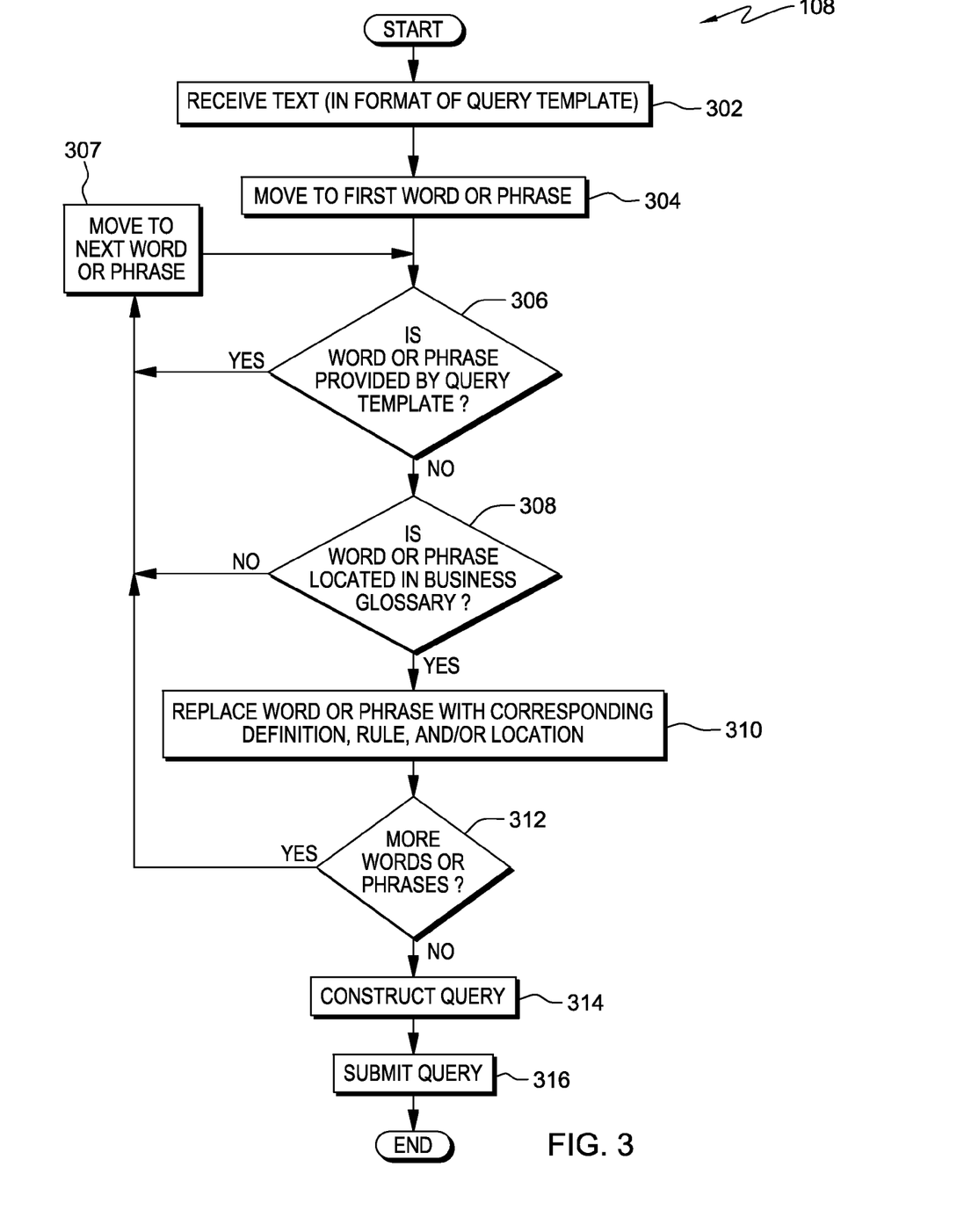
FIG. 3 depicts the operational steps of a query unfolding program for building into the query accurate terms, constraints, and locations, in accordance with an illustrative embodiment.

FIG. 3 depicts the operational steps of query unfolding program 108 for building into the query accurate terms, constraints, and locations, in accordance with an illustrative embodiment.

In an exemplary embodiment, query unfolding program 108 receives the text/query in the format of a query template (step 302). Query unfolding program 108 moves to and examines the first word or phrase of the query (step 304) and determines whether the word or phrase is provided by, or part of, the original query template (decision 306). For example, the words "select," "get," "move," "from," etc. may be terms specific to a query template with predefined actions or associations already defined for such terms. If the word is provided by the template (yes branch of decision 306), query unfolding program 108 skips the word or phrase and moves to the next word or phrase (step 307). If the word or phrase is not a predefined term from a query template (no branch of decision 306), query unfolding program 108 determines whether the word or phrase is located in the business glossary, e.g., business glossary 110 or business glossary 112 (decision 308).

The business glossary contains known business terms and corresponding definitions, rules, and/or locations. For example, the business glossary can store business vocabulary and associations. Within the business glossary, categories and terms can be defined, as well as custom attributes and values. A person of ordinary skill in the art will understand that while in one embodiment all vocabulary and associations may be stored in a single database or repository, in other embodiments, terms may be linked to appropriate associations in other databases.

In an exemplary embodiment, the business glossary connects business glossary terms to individual instances of metadata called "information assets," or "assets." An information asset is a piece of information that is of value to an organization and can have relationships, dependencies, or both with other information assets. One example of an asset is an implemented data resource such as a database table. Hence, a term in the business glossary may be linked to a specific attribute value found in a specific database table. In this manner, business terms found in the business glossary can indicate attribute names and locations, constraints (e.g., filters and other limiting clauses), organizational rules, and other pertinent information and definitions.

In one embodiment, the business glossary organizes metadata or information assets into categories corresponding to specific terms. The corresponding terms can relate to the assets that are stored in a metadata repository or to external assets according to the standards and practices of an enterprise. Words or phrases captured by query unfolding program 108 can be searched for in the business glossary for information such as a category corresponding to the term, context, status, abbreviations, related terms, synonyms, assigned assets, and other attributes.

If query unfolding program 108 does not locate the word or phrase in the business glossary (no branch of decision 308), query unfolding program 108 moves to the next word or phrase (step 307). Alternatively, if query unfolding program does locate the word or phrase in the business glossary (yes branch of decision 308), query unfolding program 108 replaces the word or phrase with any applicable corresponding definition, rule, and/or location (step 310). Query unfolding program 108 may add in additional constraints or reorganize the query based on discovered rules. In some embodiments, different rules may apply depending on the query template used.

Query unfolding program 108 determines whether there are more words or phrases (decision 312) and if there are, moves to the next word or phrase (step 307). If there are no more words or phrases, query unfolding program 108 finishes constructing the query (step 314), for example, by completing any remaining reorganization required by business rules or removing any unfilled optional terms from the query, and submits the query (step 316). If query unfolding program 108 is an instance running on a client device such as computing device 101, the query is submitted to the applicable server computer (or computers) such as server computer 102. At server computer 102, if the query is complete, server computer 102 may run the query and submit the results. If the query is not complete, server computer 102 may run its own instance of query unfolding program 108 utilizing a different and/or larger business glossary, e.g., business glossary 112.

Take for example the first examplary query from above: "provide top 3 high value customers of abc_bank in first quarter." The nearest query template was "select <attribute> from <location>*where <constraints>*and <constraints>*and <constraints>," which computing device 101 translated to "select top 3 high value customers from abc bank *where <constraints>*and <constraints>*and in first quarter." As depicted, the query words designated with a "*" are optional and may still be filled if subsequently discovered rules supply applicable terms. "Select" is a word from the query template and in this example is ignored. In another embodiment, all words and phrases are searched for in the business glossary including query words, which would either not be found or would be listed as a query verb and remain unchanged. Query unfolding program 108 on computing device 101 moves to the next word or phrase. For discussion purposes, query unfolding program 108 does not locate "top 3" and leaves it unchanged. Query unfolding program 108 locates the term "high value customer" in the business glossary in an attributes category with "high value customer" defined as a customer detail ("cust_details"). A business rule associated with the term specifies a constraint that a high value customer is one who has a balance of more than one hundred thousand dollars (balance_amount>100000). The corresponding terms are replaced with these values. The unfolding query now reads: "select top 3 cust_details from abc bank where balance_amount>100000*and <constraints> and in first quarter."

Moving to the next word, "from" is a query word and remains in place. Query unfolding program 108 locates the next word, "abc_bank," in the business glossary. A resource location asset for "abc_bank" is a database table defined as "cust_abc_bank_tbl," which is substituted for "abc_bank." This is governed by the associated definition or business rule in the business glossary. Query unfolding program 108 continues to check subsequent words and phrases. The optional constraint is ignored. The term "in first quarter" is found in a "dates" category with an associated definition/rule of "trans_date between 1-Jan-2011 and 28-Mar-2011." The definition may be substituted for the term "in first quarter." After all words and phrases have been checked and necessary replacements met, optional constraints are removed. The query now reads: "select top 3 cust_details from cust_abc_bank_tbl where balance_amount>100000 and trans_date between 1-Jan-2011 and 28_mar_2011." The query may now be run or submitted to the server containing "cust_abc_bank_tbl" to be run.

In this example, the query is submitted to the applicable server (e.g., server computer 102) and is incomplete. The process is repeated on server computer 102 with each word and phrase examined for matches in a different business glossary. Though "cust_details" could, in one embodiment, be the name of a single searchable attribute in a database, in another embodiment, an attribute substituted in at a client device may be further broken down at the server computer. For example, "cust_details" might be further defined as "cust.name" and "cust.address" based on definitions at the server computer.

The phrase "top 3" may be matched to a phrase in the server's business glossary such as "top n." The business rules associated with the term "top n" may specify that the parameters should be a transaction amount (trans_amount) and that the query should be nested n times to fetch the higher transaction amounts. Based on the located definitions and rules, the final query could be: "select cust.name, cust.address from cust_abc_bnk_tbl as c1 where (select count(trans_amount)

from cust_abc_bnk_tbl as c2 where c1.trans_amount>c2.trans_amount)>3 and balance_amount>100000 and trans_date between 1-jan-2011 and 28_mar_2011".

Though the process described above fits the query to the nearest query template prior to comparing terms to the business glossary, a person of ordinary skill in the art will recognize that in other embodiments the words or phrases may be searched for in the business glossary first. Unfolding and substituting correct terms and determining categories to which the terms belong may in some instances be helpful in matching the query to the closest query template. In another embodiment still, each word or phrase may be compared to both the query templates and the business glossary as the text is being parsed. In such an embodiment, the list of potential query templates may be reduced as each word or phrase is examined.

FIG. 4 depicts a block diagram of components of a computing system, such as computing device 101 or server computer 102 in accordance with an illustrative embodiment. It should be appreciated that FIG. 4 provides only an illustration of one implementation and does not imply any limitations with regard to the environment in which different embodiments may be implemented. Many modifications to the depicted environment may be made.

The computing system includes communications fabric 402, which provides communications between computer processor(s) 404, memory 406, persistent storage 408, communications unit 410, and input/output (I/O) interface(s) 412.

Memory 406 and persistent storage 408 are examples of computer-readable tangible storage devices and media. Memory 406 may be, for example, one or more random access memories (RAM) 414, cache memory 416, or any other suitable volatile or non-volatile storage device.

Message interpreter 104 and query unfolding program 108 on computing device 101, for example, may be stored in persistent storage 408 for execution by one or more of the respective computer processors 404 via one or more memories of memory 406. In the embodiment illustrated in FIG. 4, persistent storage 408 includes flash memory. Alternatively, or in addition to, persistent storage 408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 410, in these examples, provides for communications with other data processing systems or devices. In these examples, communications unit 410 includes one or more network interface cards. Communications unit 410 may provide communications through the use of either or both physical and wireless communications links. In another embodiment still, the computing system may be devoid of communications unit 410. Message interpreter 104 and query unfolding program 108 may be downloaded to persistent storage 408 through communications unit 410.

I/O interface(s) 412 allows for input and output of data with other devices that may be connected to the computing system. For example, I/O interface 412 may provide a connection to external devices 418 such as a keyboard, keypad, a touch screen, and/or some other suitable input device. I/O interface(s) may also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating a query by modifying a query template, the method comprising:
    identifying, by operation of one or more computer processors, one or more words in a natural language query that have previously-established associations with stored data upon which the query will be executed, wherein the natural language query is formatted to a query template that includes at least one first component;
    modifying, by operation of one or more computer processors, the at least one first component of the a query template based, at least in part, on at least one known association between the one or more words in the natural language query and an attribute specified by the at least one first component, wherein modification of the at least one first component includes adding a rule to the query template that limits possible values for the at least one first component and a name of a database table that includes the stored data upon which the query will be executed;
    generating, by operation of one or more computer processors, a new query by adding one or more of the limited values to the query template, wherein the one or more values are added to the query template based, at least in part, on the modification of the at least one first component; and
    executing, by operation of one or more computer processors, a search based on the new query.

2. The method of claim 1, wherein the query template includes a second component that includes a predefined action and the first component is modifiable based, at least in part, on the one or more words in the natural language query.

3. The method of claim 1, further comprising:
determining, by operation of one or more computer processors, at least one link between the one or more words in the natural language query and the at least one first component.

4. The method of claim 1, further comprising:
receiving, by operation of one or more computer processors, the natural language query.

5. The method of claim 1, wherein the one or more values are added to the query template based, at least in part, on the one or more words in the natural language query.

6. The method of claim 1, further comprising:
providing, by operation of one or more computer processors, a user a plurality of query templates prior to identification of the one or more words in the natural language query; and
receiving, by operation of one or more computer processors, from the user, a query formed to one of the plurality of query templates.

7. A computer program product for generating a query by modifying a query template, the computer program product comprising:
one or more computer-readable storage media and program instructions stored on the one or more computer-readable storage media, the program instructions comprising:
program instructions to identify one or more words in a natural language query that have previously-established associations with stored data upon which the query will be executed, wherein the natural language query is formatted to a query template that includes at least one first component;
program instructions to modify the at least one first component of the a query template based, at least in part, on at least one known association between the one or more words in the natural language query and an attribute specified by the at least one first component, wherein modification of the at least one first component includes adding a rule to the query template that limits possible values for the at least one first component and a name of a database table that includes the stored data upon which the query will be executed;
program instructions to generate a new query by adding one or more values to the query template, wherein the one or more of the limited values are added to the query template based, at least in part, on the modification of the at least one first component; and
program instructions to execute a search based on the new query.

8. The computer program product of claim 7, wherein the query template includes a second component that includes a predefined action and the first component is modifiable based, at least in part, on the one or more words in the natural language query.

9. The computer program product of claim 7, further comprising:
program instructions to determine at least one link between the one or more words in the natural language query and the at least one first component.

10. The computer program product of claim 7, further comprising:
program instructions to receive the natural language query.

11. The computer program product of claim 7, wherein the one or more values are added to the query template based, at least in part, on the one or more words in the natural language query.

12. The computer program product of claim 7, further comprising:
program instructions to provide a user a plurality of query templates prior to identification of the one or more words in the natural language query; and
program instructions to receive, from the user, a query formed to one of the plurality of query templates.

13. A computer system for generating a query by modifying a query template, the computer system comprising:
one or more computer processors;
one or more computer readable storage medium;
program instructions stored on the computer readable storage medium for execution by at least one of the one or more processors, the program instructions comprising:
program instructions to identify one or more words in a natural language query that have previously-established associations with stored data upon which the query will be executed, wherein the natural language query is formatted to a query template that includes at least one first component;
program instructions to modify the at least one first component of the a query template based, at least in part, on at least one known association between the one or more words in the natural language query and an attribute specified by the at least one first component, wherein modification of the at least one first component includes adding a rule to the query template that limits possible values for the at least one first component and a name of a database table that includes the stored data upon which the query will be executed;
program instructions to generate a new query by adding one or more values to the query template, wherein the one or more of the limited values are added to the query template based, at least in part, on the modification of the at least one first component; and
program instructions to execute a search based on the new query.

14. The computer system of claim 13, wherein the query template includes a second component that includes a predefined action and the first component is modifiable based, at least in part, on the one or more words in the natural language query.

15. The computer system of claim 13, further comprising:
program instructions to determine at least one link between the one or more words in the natural language query and the at least one first component.

16. The computer system of claim 13, further comprising:
program instructions to receive the natural language query.

17. The computer system of claim 13, wherein the one or more values are added to the query template based, at least in part, on the one or more words in the natural language query.

* * * * *